United States Patent
Baldal

(10) Patent No.: US 8,684,800 B2
(45) Date of Patent: *Apr. 1, 2014

(54) VEHICLE AIR DISTRIBUTION SYSTEM WITH UNIVERSAL VENT ATTACHMENT

(75) Inventor: Ronald Baldal, Paso Robles, CA (US)

(73) Assignee: CoolCop, LLC, Paso Robles, CA (US)

( * ) Notice: Subject to any disclaimer, the term of this patent is extended or adjusted under 35 U.S.C. 154(b) by 788 days.

This patent is subject to a terminal disclaimer.

(21) Appl. No.: 12/172,180

(22) Filed: Jul. 11, 2008

(65) Prior Publication Data

US 2009/0017744 A1    Jan. 15, 2009

Related U.S. Application Data

(63) Continuation-in-part of application No. 11/239,580, filed on Sep. 28, 2005, now Pat. No. 7,437,883.

(60) Provisional application No. 60/949,213, filed on Jul. 11, 2007, provisional application No. 60/613,642, filed on Sep. 28, 2004.

(51) Int. Cl.
*B60H 1/34* (2006.01)

(52) U.S. Cl.
USPC .......................................................... 454/152

(58) Field of Classification Search
USPC .................................. 454/152, 155, 284, 153
See application file for complete search history.

(56) References Cited

U.S. PATENT DOCUMENTS

| 3,280,896 | A | * | 10/1966 | Goodson et al. | 165/43 |
|---|---|---|---|---|---|
| 3,383,778 | A | | 5/1968 | Goodman | |
| 3,468,299 | A | | 9/1969 | D'Amato | |
| 3,916,639 | A | * | 11/1975 | Atkinson | 62/239 |
| 4,055,173 | A | | 10/1977 | Knab | |
| 4,892,137 | A | * | 1/1990 | Bibik, Jr. | 165/80.1 |
| 4,964,282 | A | | 10/1990 | Wagner | |
| 4,981,324 | A | * | 1/1991 | Law | 297/180.11 |

(Continued)

FOREIGN PATENT DOCUMENTS

JP    2004-218458    8/2004

OTHER PUBLICATIONS

Advanced Cooling Technology, Advanced Cooling Technology, RCPM (Renewable Phase . . . , http:\\www.coolvest.com(X(1)S(1Ifvbv45srfypuuif0weohqn))/Cool . . . , 1.

(Continued)

*Primary Examiner* — Steven B McAllister
*Assistant Examiner* — Brittany E Towns
(74) *Attorney, Agent, or Firm* — Deborah A. Peacock; Philip D. Askenazy; Peacock Myers, P.C.

(57) ABSTRACT

A body armor cooling system for law enforcement officers or military or security personnel having a hook-shaped nozzle attached to one end of a flexible hose member and a bellows assembly attached to the other end of the flexible hose member. The end of the hook-shaped nozzle is tucked beneath the protective armor that the law enforcement officer is wearing in order to provide a cooling effect. The bellows assembly is connected to the air conditioner vent opening on the dash of the vehicle. The bellows assembly makes an air tight seal with the dash of the vehicle and it can easily be attached and detached. A universal vent attachment system makes the present invention usable in any vehicle.

9 Claims, 14 Drawing Sheets

(56) References Cited

U.S. PATENT DOCUMENTS

| | | |
|---|---|---|
| 5,062,424 A | 11/1991 | Hooker |
| 5,197,294 A | 3/1993 | Galvan et al. |
| 5,702,149 A * | 12/1997 | Sweeney ............... 296/152 |
| 5,823,869 A | 10/1998 | Paturzo |
| 5,921,467 A | 7/1999 | Larson |
| 6,131,645 A * | 10/2000 | Barr ....................... 165/41 |
| 6,178,562 B1 | 1/2001 | Elkins |
| 6,843,717 B1 | 1/2005 | Bennett |
| 6,874,332 B2 | 4/2005 | Forgach |
| 6,884,159 B1 * | 4/2005 | Ferraud, Jr. .............. 454/119 |
| 6,902,473 B1 | 6/2005 | Goobeck |
| 6,993,930 B2 | 2/2006 | Blackstone |
| 7,437,883 B1 | 10/2008 | Baldal |
| 2007/0118956 A1 | 5/2007 | Sawicki et al. |

OTHER PUBLICATIONS

Ventilation Vest, Entrak—How it works—[ventilation Vest]—Personal Cooling Systems, http:\\www.ventilationvest.com/entrak/military/product-information/ . . . , Jan. 17, 2012, 1-4.

Mondal, S., "Phase change materials for smart textiles—An overview", ScienceDirect—Applied Thermal Engineering, Department of Chemical and Biological Engineering. Colorado State University, Fort Collins, CO 80523-1370, USA, Feb. 11, 2007, 1-15.

\* cited by examiner

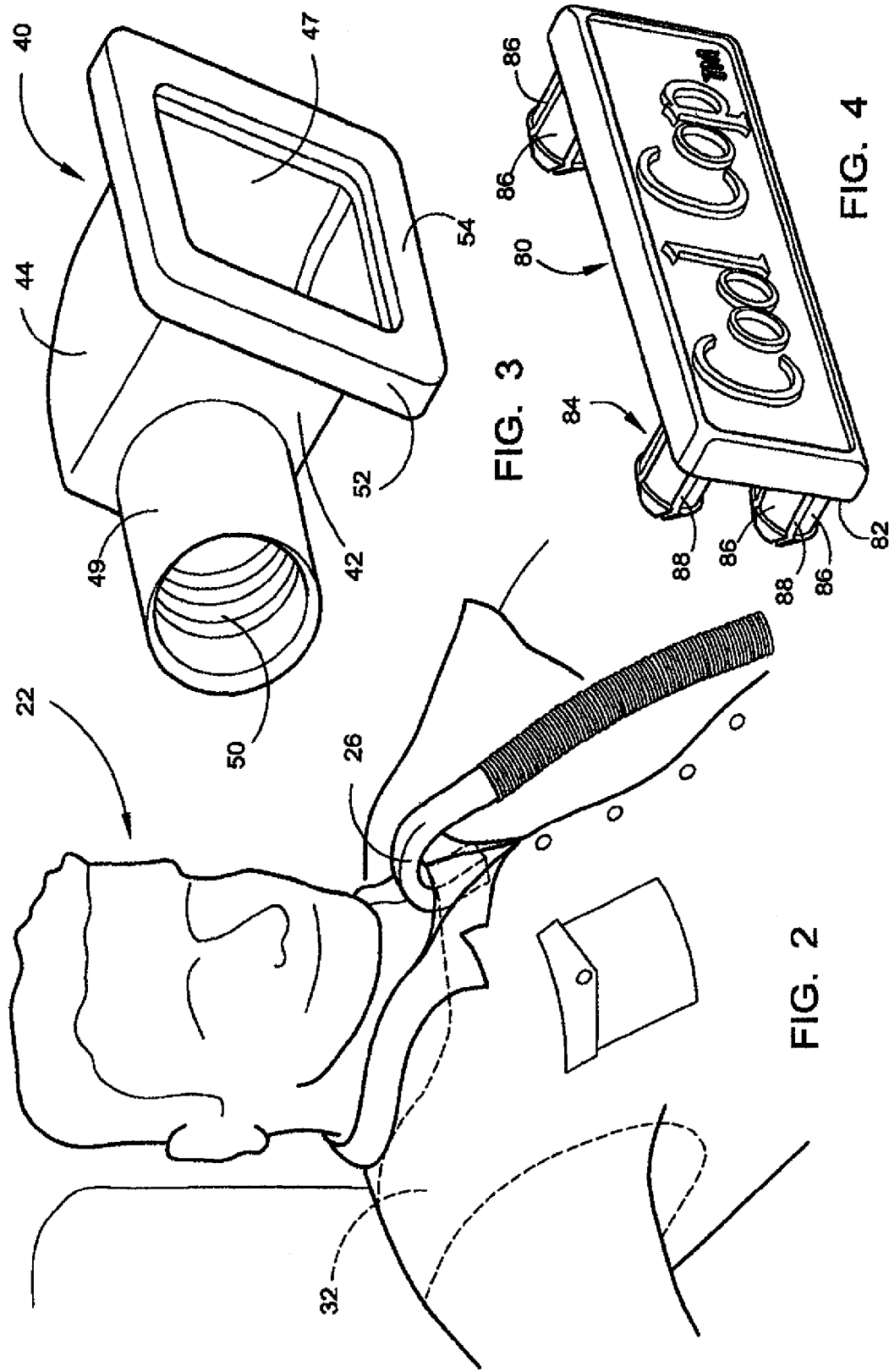

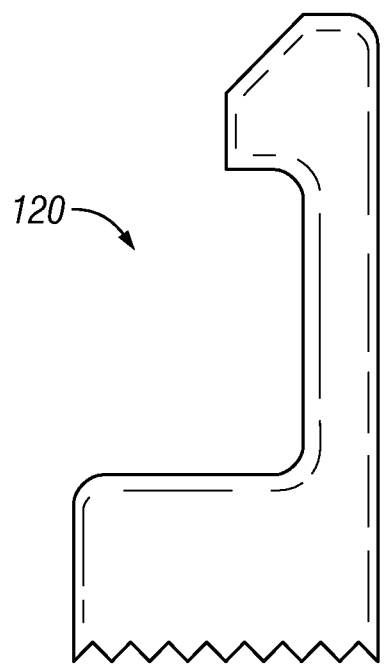
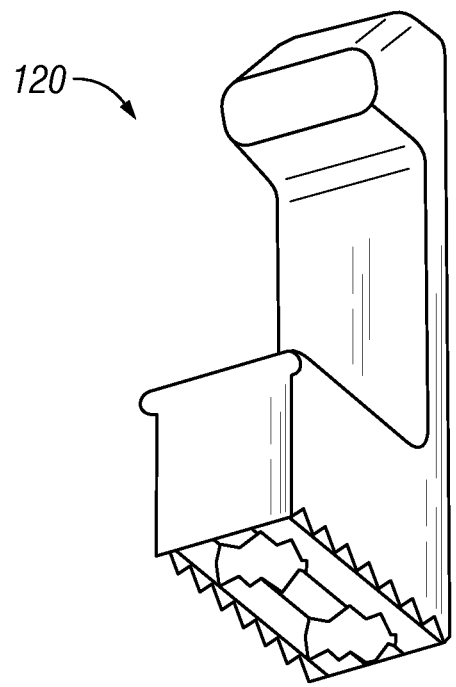
FIG. 15

VEHICLE AIR DISTRIBUTION SYSTEM WITH UNIVERSAL VENT ATTACHMENT

CROSS-REFERENCE TO RELATED APPLICATIONS

This application claims the benefit of the filing of U.S. Provisional Patent Application Ser. No. 60/949,213, entitled "Body Armor Cooling System Having a Universal Vent Attachment", filed on Jul. 11, 2007. This application is also a continuation-in-part application of U.S. patent application Ser. No. 11/239,580, entitled "Body Armor Cooling System, filed on Sep. 28, 2005, which application claims the benefit of the filing of U.S. Provisional Patent Application Ser. No. 60/613,642, filed on Sep. 28, 2004. The specifications and claims of all said applications are incorporated herein by reference.

BACKGROUND OF THE INVENTION

Field of the Invention

Technical Field

The invention relates to the cooling of an individual and more particularly to a law enforcement officer or military personnel when he is in his vehicle and wearing body armor. When law enforcement officers or military or security person working in warm climates or climates having high humidity, quite often they become hot and sweaty while riding in their vehicles. When a protective armor vest must be worn, the wearer is even more uncomfortable. In these situations, no amount of air conditioning coming out of the vehicle air vents can keep the wearer cool and dry.

BRIEF SUMMARY OF THE INVENTION

The present invention is a system for distributing air in a vehicle, the system comprising one or more catches sized to attach to a vent in the vehicle, a plate connected to the catches, a cover connected to the plate, and a hose for distributing air from the vent, a first end of the hose connected to the cover. Mating surfaces of the catches and the plate are preferably grooved or textured. The catches are preferably substantially rigid but flexible enough to clip to vent louvers. The plate preferably comprises an opening to transmit air from the vent. The cover preferably comprises sealing material, preferably weatherstripping, to surround and substantially seal the vent. The first hose end is preferably threaded and the cover preferably comprises a threaded connector for mating with the threaded end of the hose. A second end of the hose is optionally inserted between body armor and a vehicle occupant wearing the body armor, or is optionally connected to and delivers air from the vent to a rear area of the vehicle, the vehicle trunk, a vehicle compartment, behind a vehicle partition, a vehicle truck bed, a pet carrier, a kennel, or a pet bed.

The present invention is also a method for distributing air in a vehicle, the method comprising the steps of fitting one or more catches to a vehicle vent, attaching the catches to a plate, attaching the plate to the vent by inserting the catches into the vent, attaching a cover to the plate, attaching a hose to the cover, distributing air from the vent through the hose. The step of attaching the plate to the vent preferably comprises attaching the catches to vent louvers. The distributing step preferably comprises passing air through an opening in the plate. The method preferably further comprises the step of substantially sealing the vent, which may optionally be performed while the cover is attached to the plate. The step of attaching a hose to the cover preferably comprises screwing a threaded end of the hose to a threaded connector on the cover. The distributing step preferably comprises distributing air to a location selected from the group consisting of between body armor and a vehicle occupant wearing the body armor, a rear area of a vehicle, a vehicle trunk, a vehicle compartment, behind a vehicle partition, a vehicle truck bed, a pet carrier, a kennel, and a pet bed.

One embodiment of the body armor cooling system has three major components. They are the hook-shaped nozzle that is inserted on one end of a flexible hollow hose and the bellows assembly that is installed on the other end of the flexible hollow hose. The principal part of the bellows assembly is a soft plastic bellows member having a hollow interior chamber. A tubular neck portion is in communication with the hollow interior chamber and it also provides structure for attachment to one end of the flexible hollow hose member. The bellows member also has a bottom opening that would be in communication with and surround, preferably substantially sealing, an air conditioner ventilation vent on the dash of the vehicle. The bellows member has a closed loop inwardly extending flange member on its bottom and that would be pressed against the surface of the dash just surrounding the ventilation opening. The V-shaped spring clip is mounted in the interior of the bellows member and it has les members that can be compressed inwardly toward each other in order to insert the cam surface leg portions of the spring clip into the ventilation opening. After they passed through the opening, the cam surface leg members expand outwardly and the shoulder leg portion of the leg members press upwardly against the interior surface of the dash and seals the closed loop inwardly extending flange member of the bellows member against the outer surface of the dash. The structure for supporting the U-shaped spring clip inside the bellows member is a spring clip rt plate having a pair of laterally spaced mounting clips that would engage the cross member portion of the V-shaped spring clip. The spring clip support plate has apertures at its four corners that would receive the snap pins extending downwardly from a backing plate. The four snap pins are inserted through apertures in the top wall of the bellows member and then into the apertures in the spring clip support plate where they would expand and be rigidly secured. The bellows member would be made of a plastic or rubber material that is flexible enough so that the left and right side walls thereof can be squeezed inwardly to compress the leg members of the spring clip together for removal of the bellows member assembly from the dash.

The present invention provides a body armor cooling system that can be used by law enforcement officers and military or security personnel to keep them from becoming overheated in their vehicle while wearing protective armor.

The present invention is also a method and apparatus for heating or cooling an area of a vehicle that does not have dedicated air vents, such as a pet, animal, or prisoner area behind a partition that blocks air circulation. The present invention may also cool mobile computer systems that are in the trunk of a vehicle, and heat or cool truck camper shells. The present invention may also be attached to a kennel, dog crate, pet carrier, pet bed, or the like in order to provide heating or cooling to an animal within. The animal carrier may be located inside the vehicle or outside the vehicle, for example on a pickup truck bed.

An advantage of the universal body armor or vehicle heating or cooling system of the present invention is that it is easily installed in any vehicle, such as a law enforcement or military vehicle.

Another advantage of the present invention is that the nozzle is quickly and easily removed from the area of the user's chest.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIG. 2 is an elongated front perspective view illustrating the hook-shaped nozzle of the body armor cooling system inserted beneath the law enforcement officer's protector armor;

FIG. 3 is an enlarged bottom perspective view of the bellows member;

FIG. 4 is an enlarged top perspective view of the backing plate;

FIG. 15 shows a side view and perspective view of the catch;

DETAILED DESCRIPTION OF THE INVENTION

Custom Rapid Installation Embodiment

Figure 1:
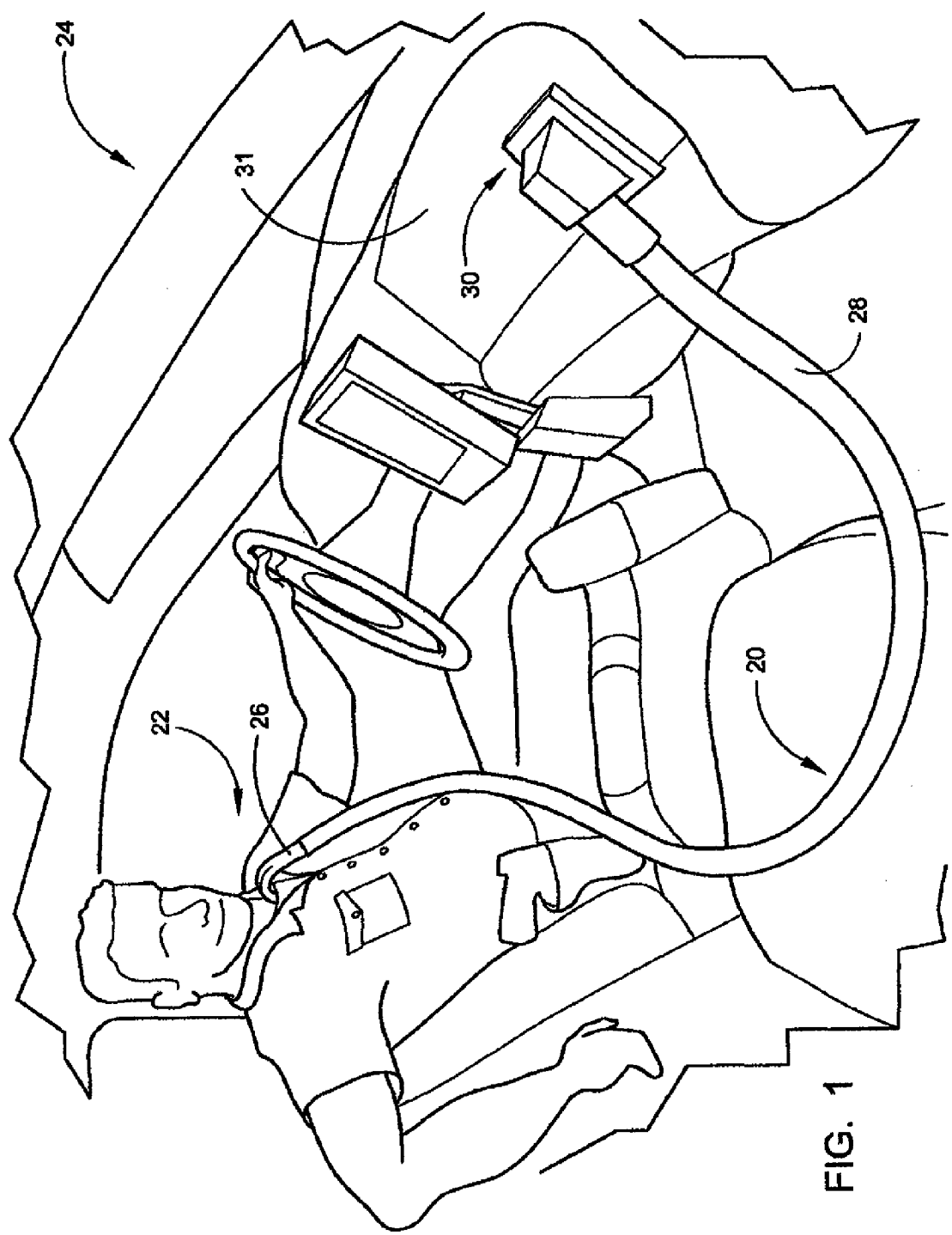
FIG. 1 is a front perspective view illustrating a law enforcement officer in a vehicle and being hooked-up to the body armor cooling system.
Figure 5:
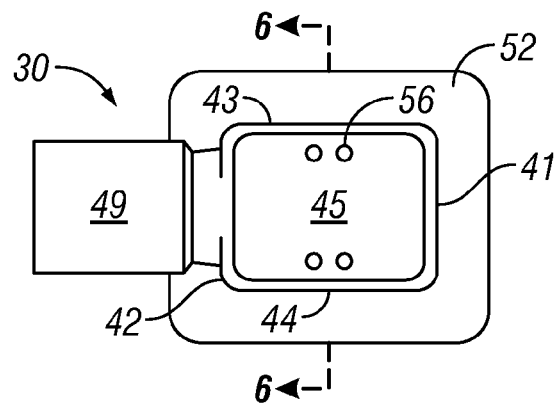
FIG. 5 is a top plan view of the bellows member with the backing plate removed.

One embodiment of the body armor cooling system is generally designated numeral 20. This embodiment is designed to fit a specific vehicle, and can be rapidly installed and removed from the vent of the intended vehicle. In FIG. 1 a law enforcement officer or military person 22 is depicted seated in a vehicle 24 having a dash 31. The major components of the body armor cooling system 20 are hook-shaped nozzle 26, flexible hollow member 28 and bellows assembly 30.

FIG. 2 is a close-up perspective view of the law enforcement officer or military person 22 showing that the outlet end of hook-shaped nozzle 26 has been inserted beneath the protective armor 32 that the officer is wearing. Protective armor 32 is normally a bullet proof vest.

Bellows assembly 30 will now be described by referring to FIGS. 3-10. The most prominent part of the assembly is bellows member 40 that normally be made of a soft plastic material. It has a front wall 41, a rear wall 42, a left side wall 43, a right side wall 44 and a top wall 45. Bellows member 40 has a hollow interior chamber 47 and it has an open bottom end. A tubular neck portion 49 having internal threads 50 extends from rear wall 42. A closed loop shoulder portion 52 extends outwardly from the bottom ends of the respective side walls of bellows 40. A closed loop inwardly extending flange member 54 is formed on the bottom end of closed loop shoulder portion 52. Top wall 45 has four apertures 56 whose purpose will be described later.

The U-shaped spring clip 60 is best illustrated in FIGS. 6-10. It has a cross member 61 having a longitudinally extending X-axis. A pair of laterally spaced leg members 62 extend downwardly from the opposite ends of cross member 61. The bottom ends of the respective leg member 62 have a shoulder leg portion 64 extending outwardly away from each other. A cam surface leg 66 extends downwardly and inwardly from the respective shoulder leg portions 64. Each cam surface leg 66 has an upwardly extending toe portion 68 adjacent its bottom end.

Figure 9:
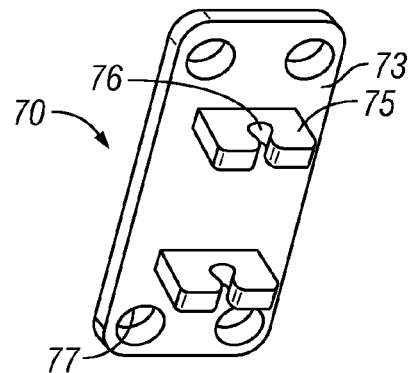
FIG. 9 is a bottom perspective view of the spring clip support plate.
Figure 10:
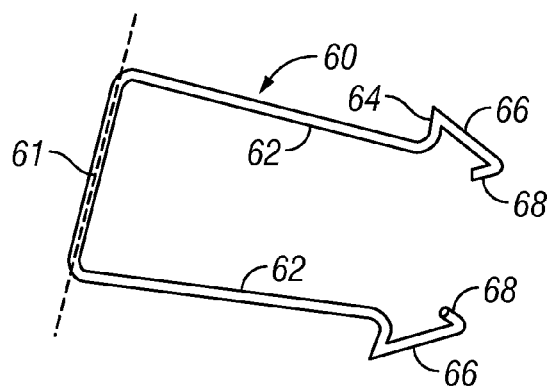
FIG. 10 is a top plan view of the V-shaped spring clip.

Spring clip support plate 70 is illustrated in FIG. 9. It has a bottom surface 71. A pair of mounting clips 73 extend downwardly from bottom surface 71. Each mounting clip 73 has a pair of laterally spaced fingers 75 with an opening 76 formed there between. Fingers 75 are resilient enough to allow the cross member 61 to be pressed inwardly between them after which the fingers snap back together. A plurality of apertures 77 are located at the corners of spring clip support plate 70.

Figure 6:
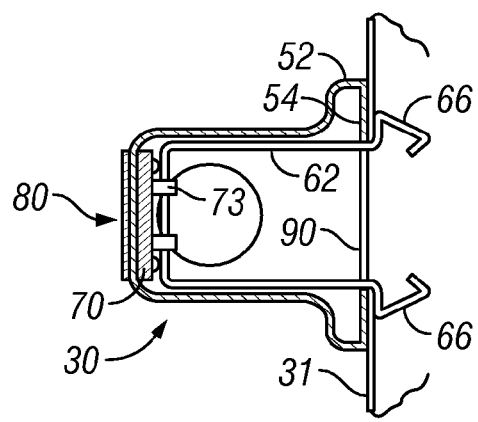
FIG. 6 is a vertical cross section taken along lines 6-6 of Fig.
Figure 7:
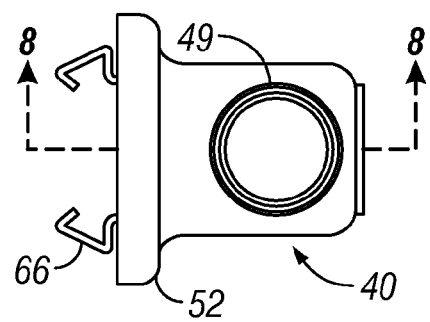
FIG. 7 is a rear elevation view of the bellows member assembly.
Figure 8:
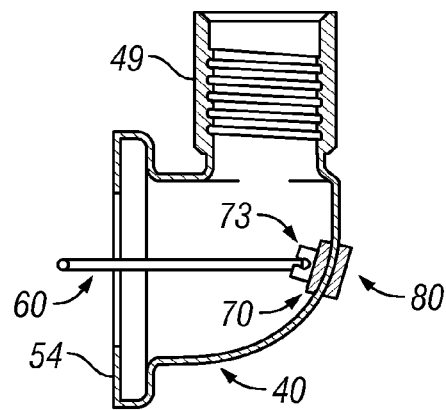
FIG. 8 is a cross sectional view taken along lines 8-8 of FIG. 7.

Backing plate 80 is illustrated in FIG. 4. It has a top surface 81 and a bottom surface 82. A plurality of snap pins 84 are integrally formed with backing plate 80 and they extend downwardly therefrom. Each snap pin then has four leg members 86 with slots 88 between them. Each leg member 86 has a beveled front end surface that allows them to be pressed into the respective apertures 77 and they snap outwardly when fully inserted in the apertures. The cross sections shown in FIGS. 6 and 8 show the assembled interior structure. FIG. 6 shows the ventilation opening 90 in dash 31. When installing bellows member assembly 30 over ventilation opening 90, the cam surface leg portions 66 of U-shaped spring clip 60 are compressed inwardly until they pass through the opening 90 in the dash. After that they spring backward and form an airtight seal between the closed inwardly extending flange member 54 and the outer surface of dash 31. If there is a wish to remove the bellows assembly member from the dash, it is merely necessary to press inwardly on the flexible side walls of bellows member 40 that is made of soft plastic material. This will cause the leg member 62 to be compressed inwardly toward each other thereby allowing the cam surface leg portions 66 to be withdrawn from the ventilation opening 90.

Universal Vent Attachment

The previously described embodiments of the invention require that a different bellows member assembly 30 be used for each size or type of vehicle vent. This means that dozens of different assemblies need to be manufactured and inventoried in order to conform to the many vent sizes of existing or planned vehicles.

As used throughout the specification and claims, the term "vehicle" means any vehicle whatsoever, such as a car, taxicab, police or other law enforcement vehicle, truck, van, military vehicle, tank, airplane, helicopter, boat, and the like.

Figure 11:
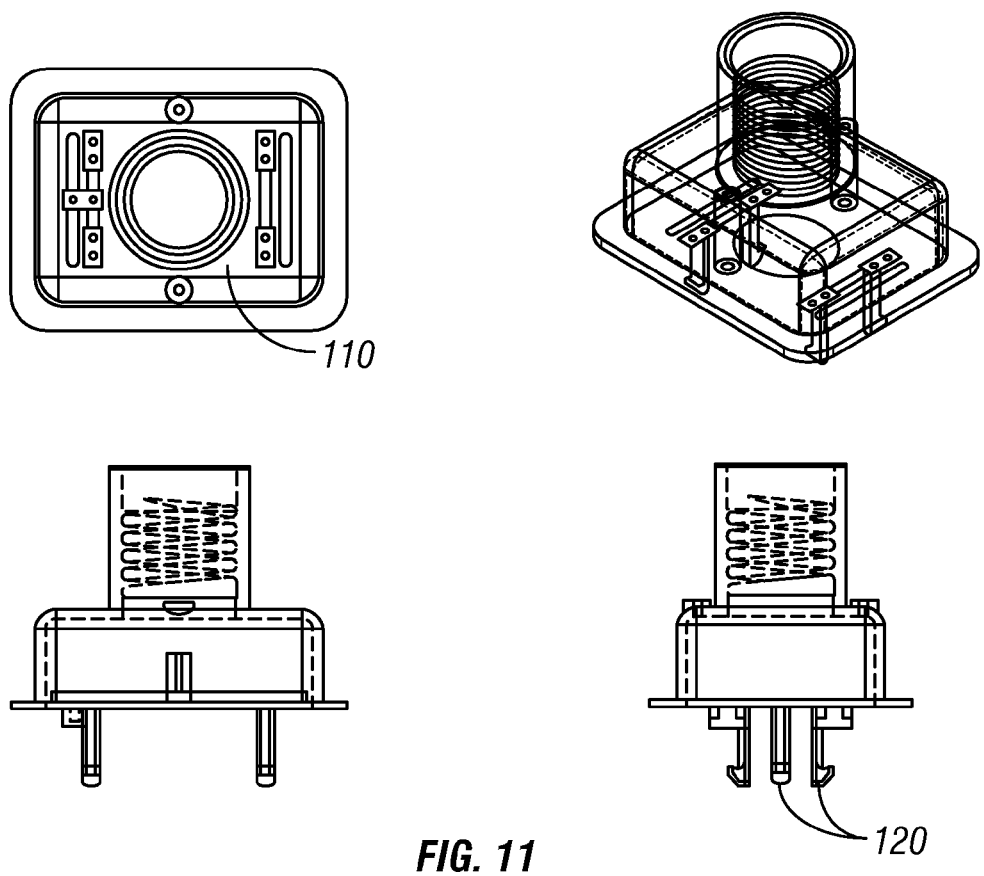
FIG. 11 shows drawings of an embodiment of the universal attachment.
Figure 12:
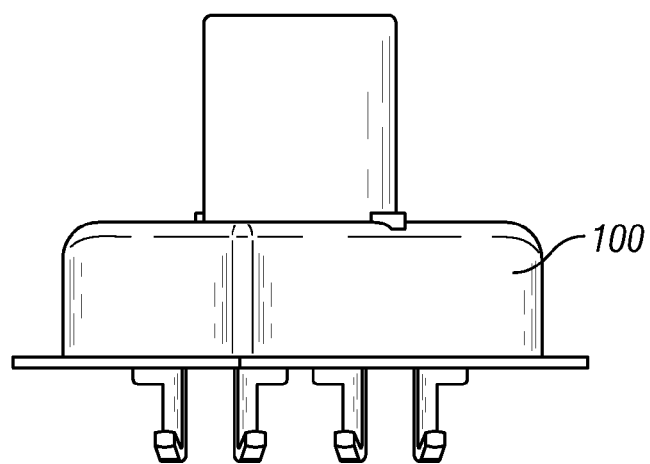
FIG. 12 is a perspective view of the universal attachment.

Another embodiment of the present invention comprises a universal vent attachment which can fit virtually any vent, such as a heating or air conditioning vent. As shown in FIGS. 11 and 12, the attachment comprises cover 100, base plate 110 preferably disposed within cover 100, and a plurality of catches 120. Cover 100 and base plate 110 are preferably sized to be larger than most or all vehicle vents currently in common use. Any number of catches 120 may be utilized in order to attach the attachment to the vent with the desired tightness. Catches of a variety of sizes may be utilized to ensure proper fit to any vent. The catch width is preferably chosen to be approximately the same width as that of the vent's louvers, and preferably is sufficiently long to extend beyond the surface of the dashboard or other surface in which the vent is set.

Figure 13:
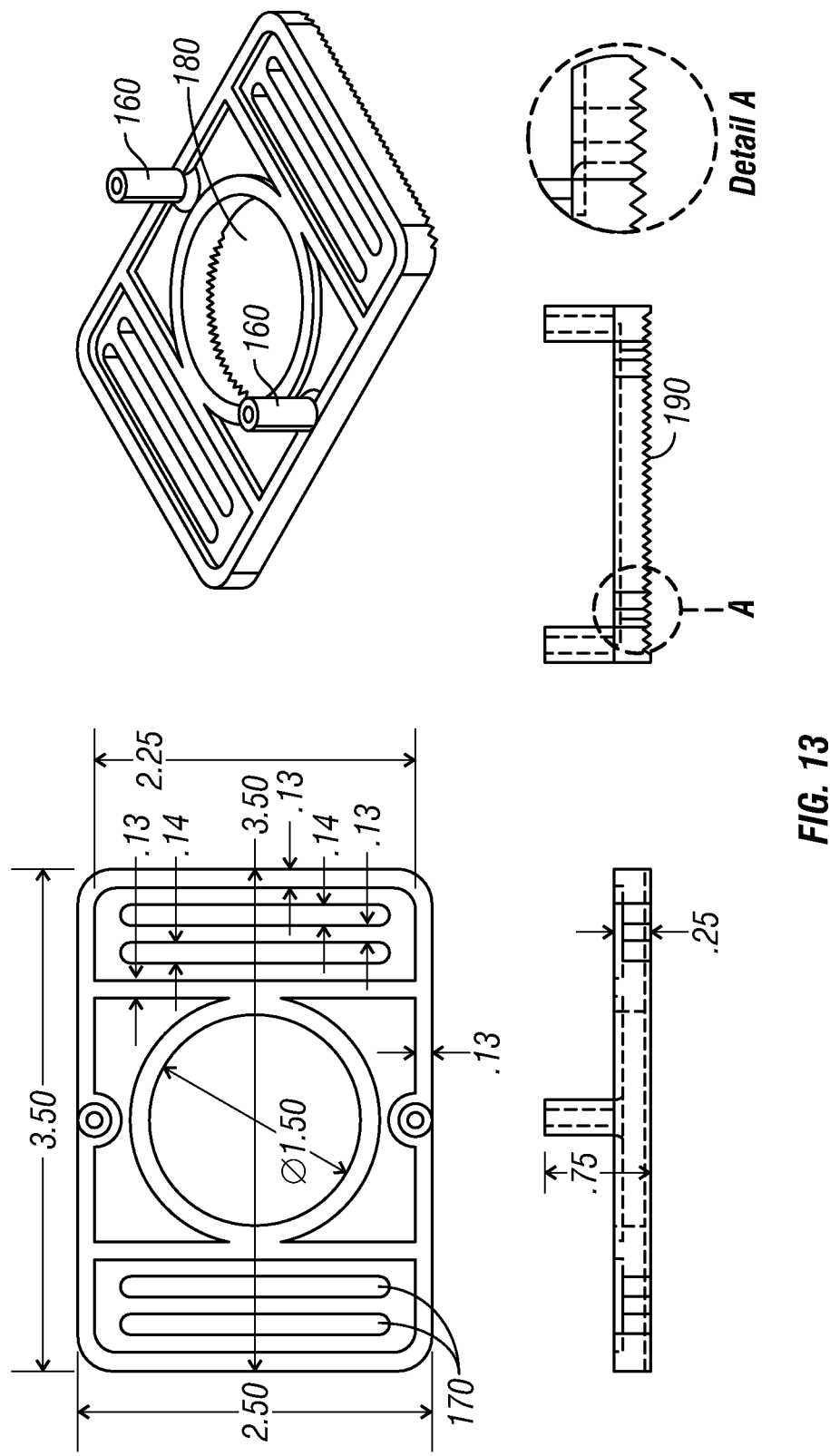
FIG. 13 shows various drawings of a base plate used in the universal attachment embodiment.

As shown in FIG. 13, base plate 110 preferably comprises connectors 160 for receiving screws that hold cover 100 to the base plate. Base plate 110 also preferably comprises one or more slots 170 for receiving screws to fasten catches 120 to base plate 110, as described below. Base plate 110 preferably comprises opening 180 for allowing passage of air from the vent to the user. Bottom surface 190 of base plate 110 preferably comprises grooves, or is optionally otherwise textured, for preventing slippage of catches 120.

Figure 14:
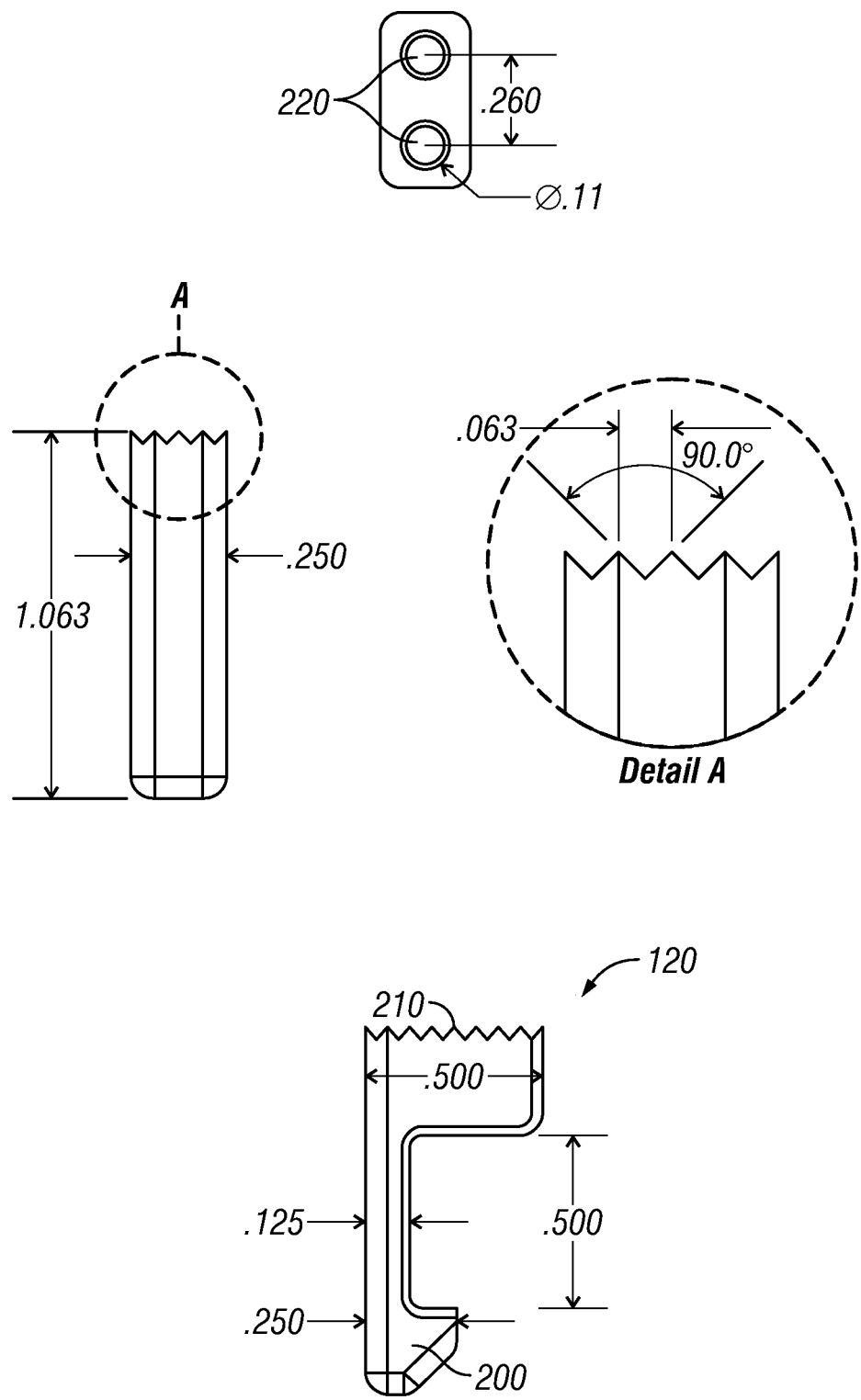
FIG. 14 shows various drawings of a catch used in the universal attachment embodiment.

As shown in FIGS. 14 and 15, catch 120 preferably comprises hook 200 for attaching to the interior of a vent opening. The top surface 210 of catch 120 is grooved or textured to mate with bottom surface 190 of base plate 110. In this way, one or more catches 120 may be placed anywhere along the bottom of the base plate, in any orientation, in order to securely attach the base plate to any size vent. The grooved or textured surfaces thus preferably prevent slippage. Catches 120 are preferably aligned so that screw holes 220 are visible through slots 170. (Therefore, the top of catch 120 is preferably wider than the width of slot 170.) Once the correct positioning of catches 120 is achieved, screws are extended through slots 170 into screw holes 220 in order to secure base plate 110 to catches 120. Catches 120 are preferably somewhat rigid, with very little flexure. The base plate is then preferably snapped into the vent, thereby engaging the catches with the vent louvers.

Figure 16:
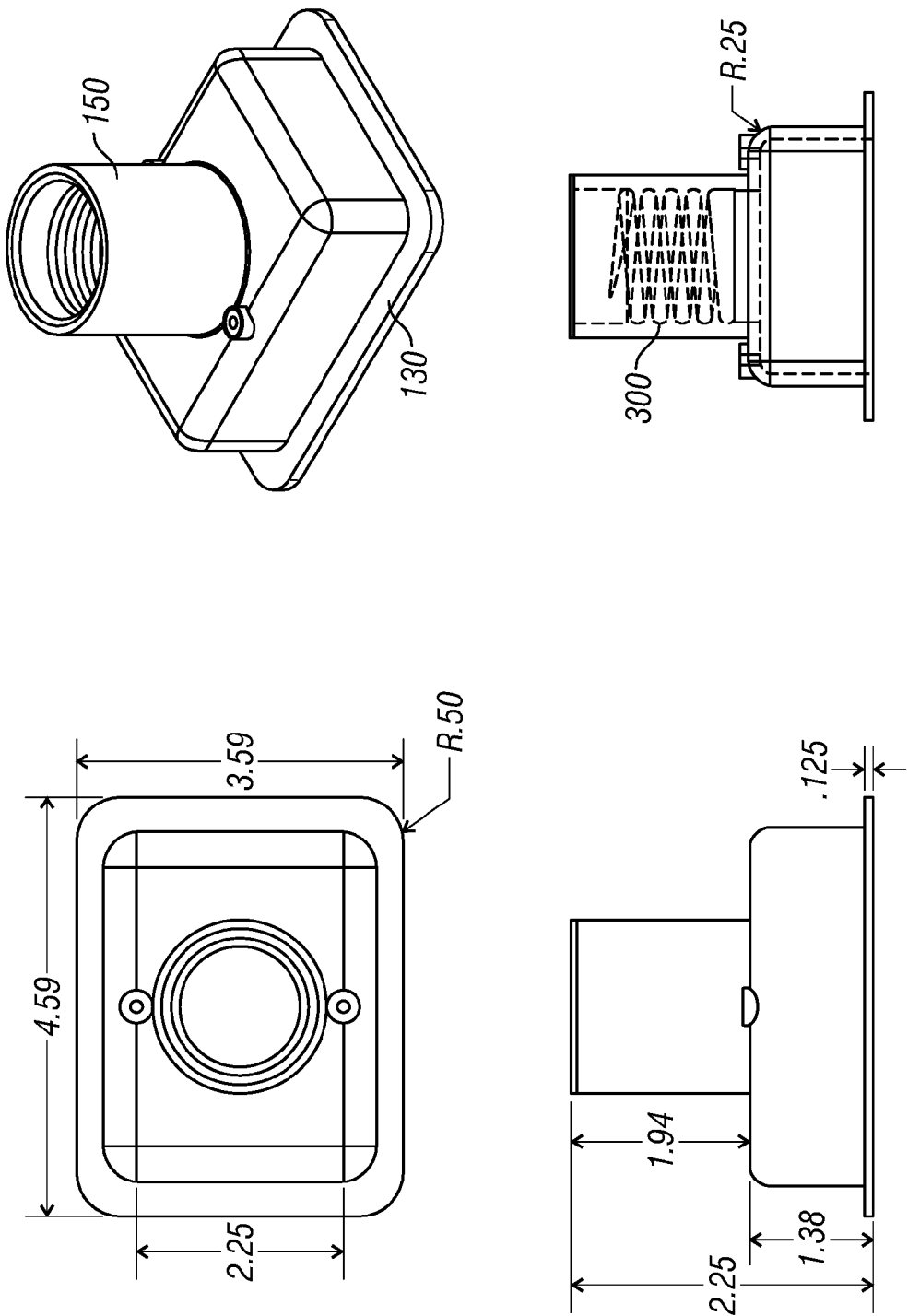
FIG. 16 shows various drawings of a cover used in the universal attachment embodiment.
Figure 17:
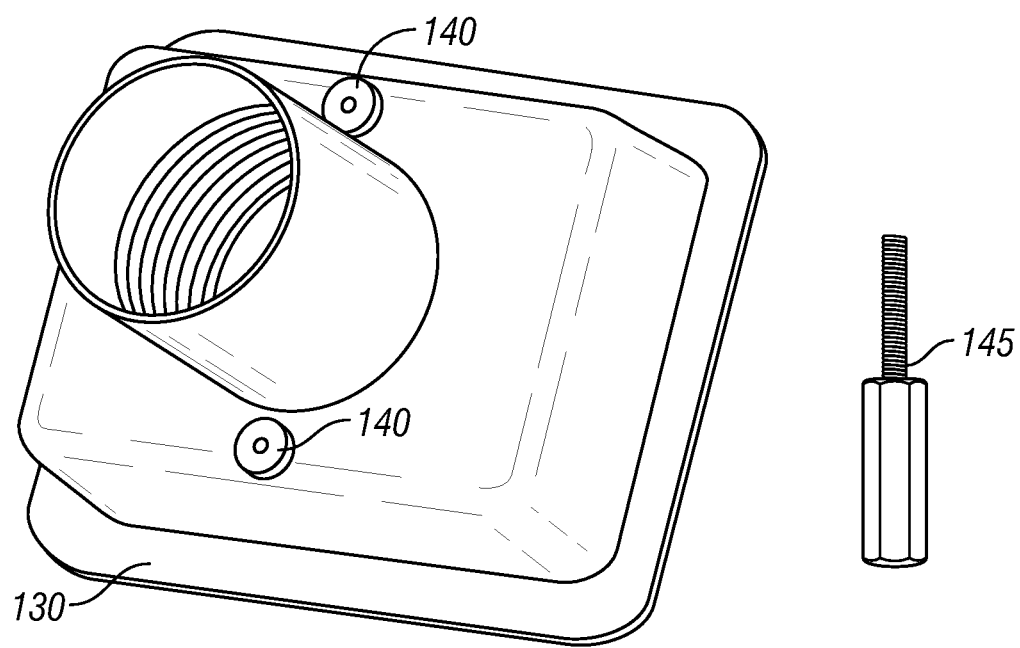
FIG. 17 is a perspective view of the cover.

As shown in FIGS. 16 and 17, cover 100 preferably comprises seal 130, which may optionally comprise weatherstripping or the like, for surrounding and substantially sealing a vent. Cover 100 also preferably comprises screw holes that receive screws 140 for attaching the cover to the base plate via receivers 160 after base plate 110 has been installed on the vent. Receivers 160 are preferably part of, or otherwise attached to, base plate 110. Screw 140 may comprise conventional screws requiring a screwdriver or Allen wrench, or may optionally comprise thumbscrew 145 to permit installation and removal of the cover without requiring tools, or any other fastener known in the art. Cover 100 also preferably comprises extension 150, which preferably comprises internal threads 300 for receiving the threaded portion of a hose for transporting cool, warm, and/or dry air to the user. However, any other means of connecting the hose to the cover may be employed, including but not limited to a simple press fit connection, quick connect, fasteners, etc.

Figure 18:
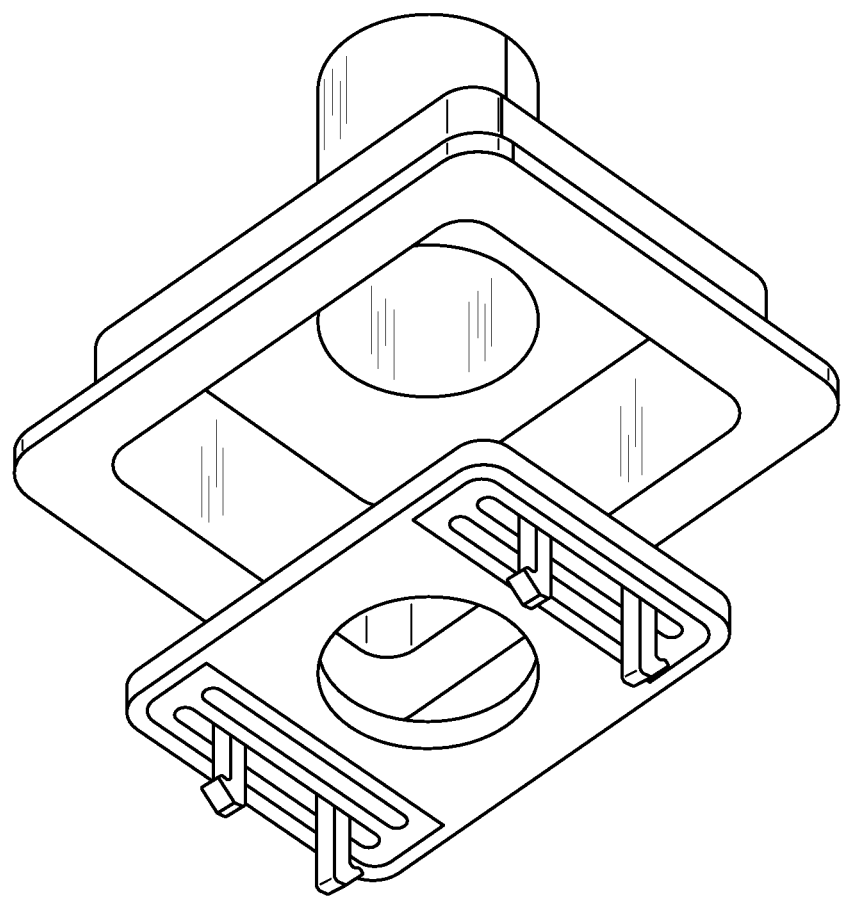
FIGS. 18-20 are various exploded perspective views of the universal attachment embodiment.
Figure 19:
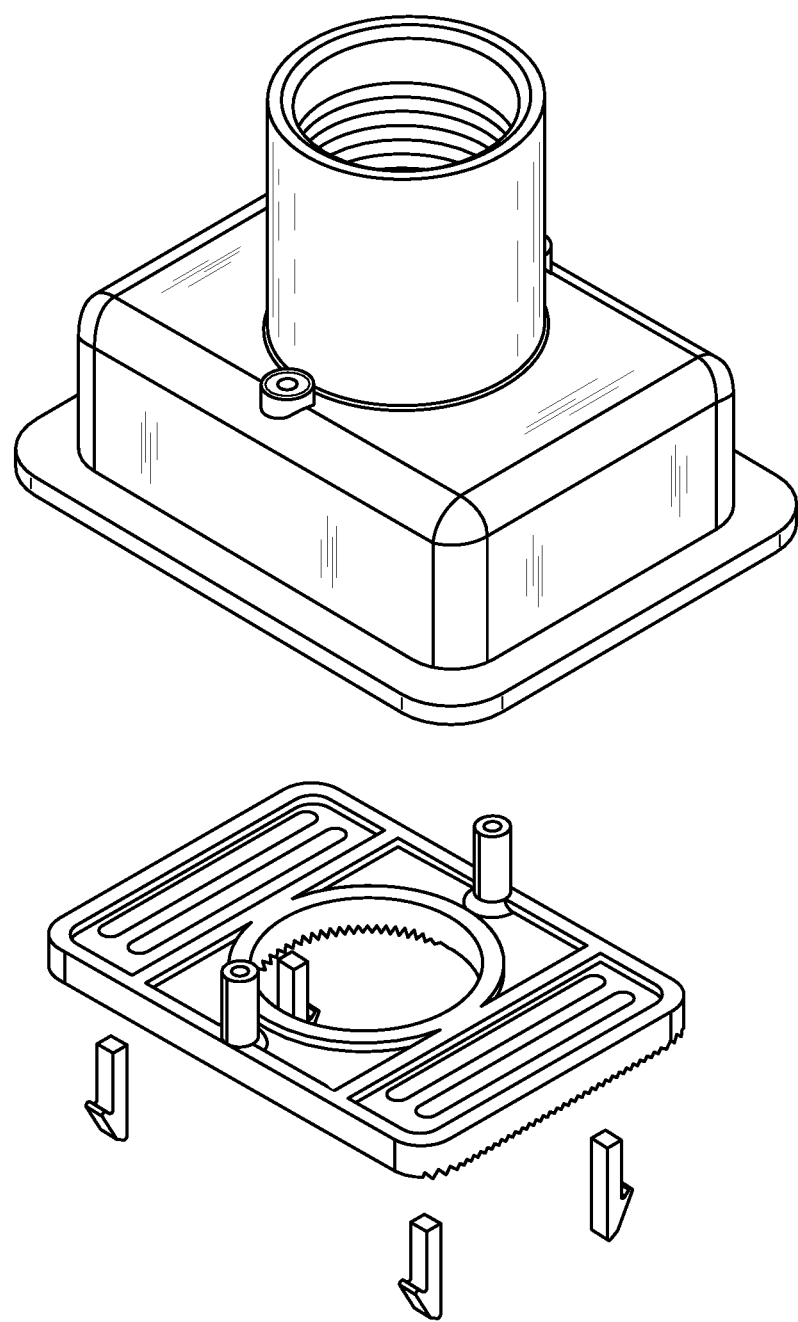
Figure 20:
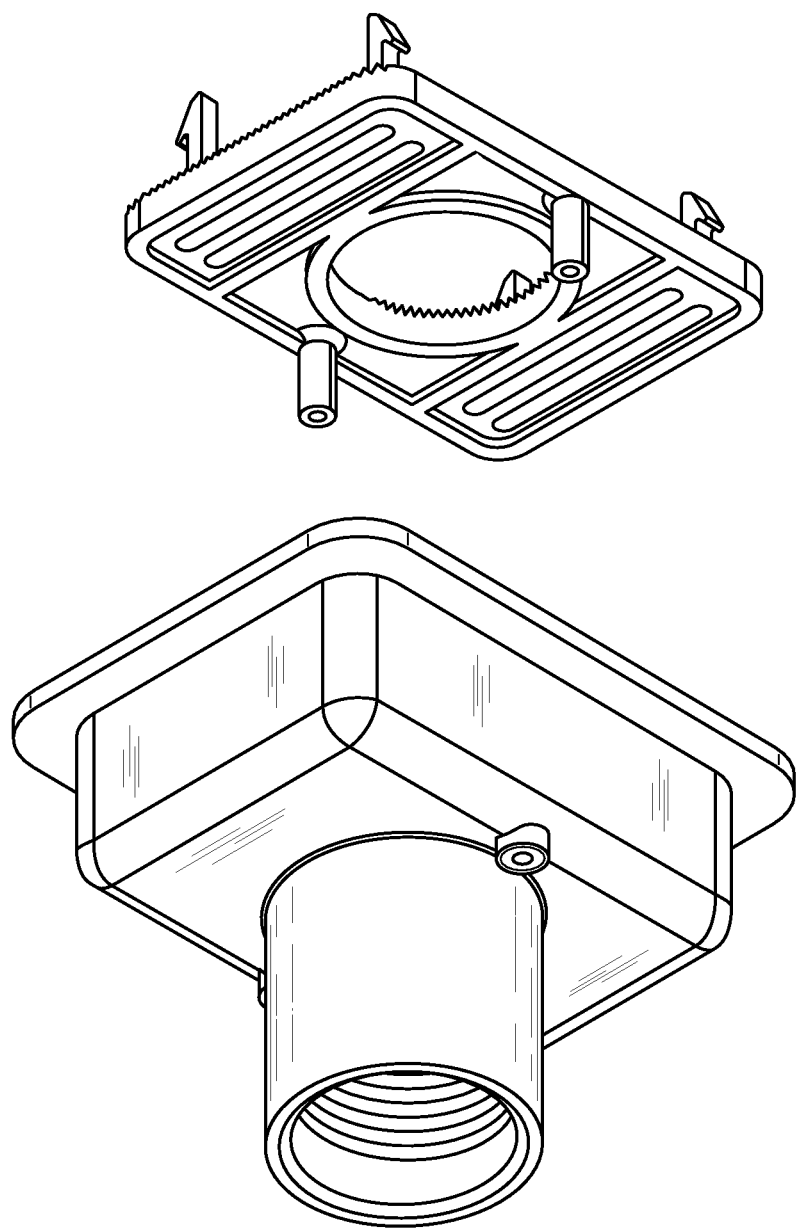
Figure 21:
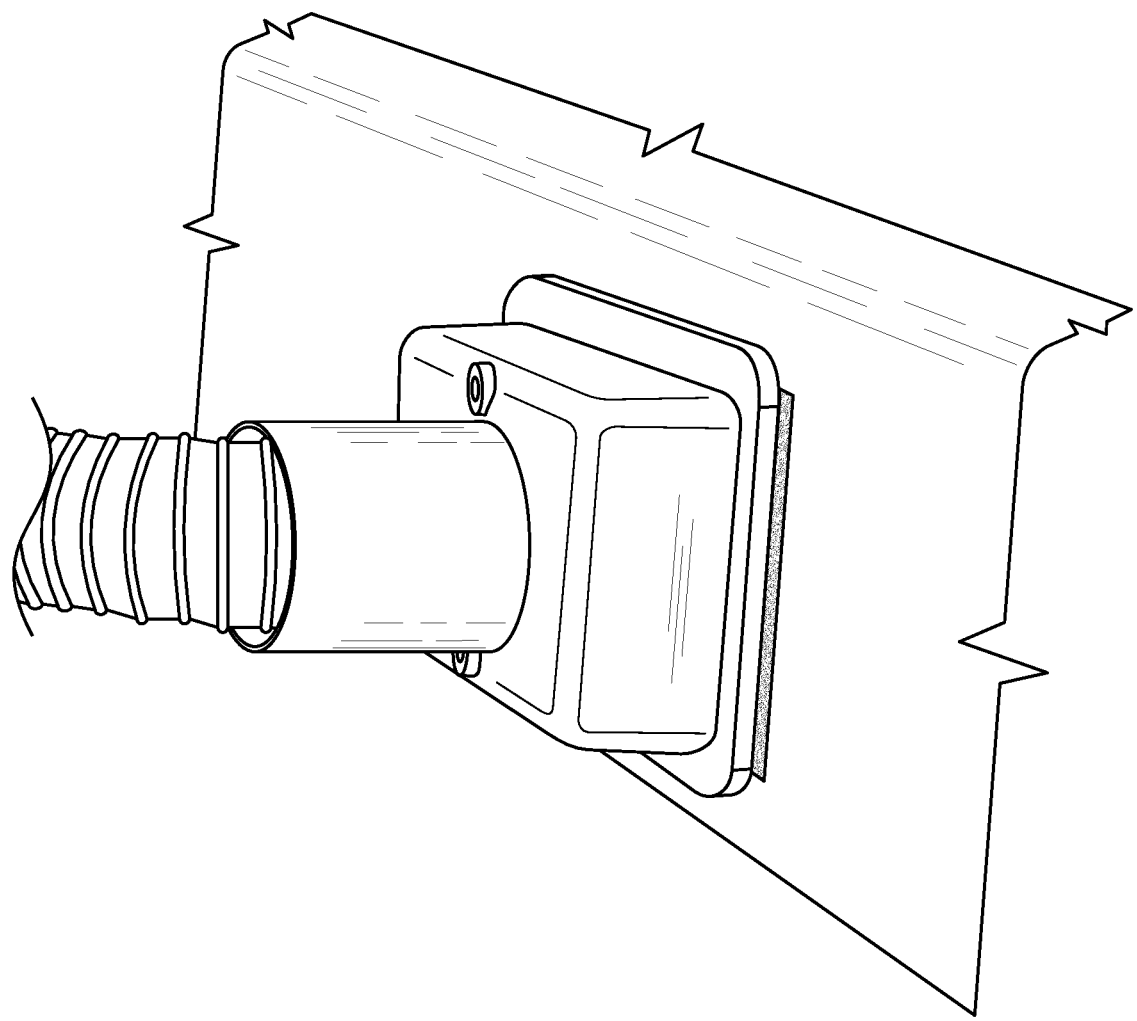
FIG. 21 is a photograph showing the universal attachment installed on a vehicle.

FIGS. 18-20 show various exploded views of one universal attachment embodiment of the present invention. FIG. 21 shows the universal attachment installed on a vehicle and ready for use.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and the number and configuration of various vehicle components described above may be altered, all without departing from the spirit or scope of the invention.

What is claimed is:

1. A system for distributing air in a vehicle, the system comprising:
   one or more catches sized to attach to a vent in the vehicle, each catch comprising a top surface and a bottom end opposite said top surface comprising a protrusion for attaching a portion of the vent structure;
   a plate comprising a bottom surface directly mateable to said top surfaces of said one or more catches at least one fastener for fastening each of said one or more catches to said plate;
   a cover connectable to said plate; and
   a hose for distributing air from the vent, a first end of said hose connectable to said cover;
   wherein a number, location, and/or orientation of said one or more catches for mating with said bottom surface of said plate may be varied depending on a configuration of the vent;
   and wherein when said cover is connected to said plate said cover surrounds seals the vent.

2. The system of claim 1 wherein said top surfaces of said catches and said bottom surface of said plate are grooved or textured, thereby reducing or preventing slippage of said catches when said catches are mated to said plate.

3. The system of claim 1 wherein said catches are sufficiently flexible to clip to vent louvers.

4. The system of claim 1 wherein said plate comprises an opening to transmit air from the vent.

5. The system of claim 1 wherein said cover comprises sealing material to surround and substantially seal the vent.

6. The system of claim 5 wherein said sealing material comprises weatherstripping.

7. The system of claim 1 wherein said first hose end is threaded and said cover comprises a threaded connector for mating with said threaded first hose end.

8. The system of claim 1 wherein a second end of said hose is inserted between body armor and a vehicle occupant wearing the body armor.

9. The system of claim 1 wherein a second end of said hose is connected to and delivers air from the vent to a rear area of the vehicle, a vehicle trunk, a vehicle compartment, behind a vehicle partition, a vehicle truck bed, a pet carrier, a kennel, or a pet bed.

* * * * *